United States Patent
Lou et al.

(10) Patent No.: US 11,202,293 B2
(45) Date of Patent: *Dec. 14, 2021

(54) WIRELESS NETWORK ARCHITECTURE FOR PROVIDING MEDIA CONTENT

(71) Applicants: AT&T Intellectual Property I, L.P., Atlanta, GA (US); AT&T Mobility II LLC, Atlanta, GA (US)

(72) Inventors: Yuang Lou, Dunwoody, GA (US); Douglas A. Duet, Roswell, GA (US); George O'Quinn Hirvela, Carrolton, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 63 days.

This patent is subject to a terminal disclaimer.

(21) Appl. No.: 16/785,137

(22) Filed: Feb. 7, 2020

(65) Prior Publication Data

US 2020/0178260 A1    Jun. 4, 2020

Related U.S. Application Data

(63) Continuation of application No. 15/934,398, filed on Mar. 23, 2018, now Pat. No. 10,588,132, which is a
(Continued)

(51) Int. Cl.
*H04W 72/04* (2009.01)
*H04W 4/06* (2009.01)
(Continued)

(52) U.S. Cl.
CPC ....... *H04W 72/0486* (2013.01); *H04L 5/0007* (2013.01); *H04W 4/025* (2013.01);
(Continued)

(58) Field of Classification Search
CPC ............ H04W 72/0486; H04W 4/025; H04W 52/243; H04W 72/042; H04W 72/0453;
(Continued)

(56) References Cited

U.S. PATENT DOCUMENTS 6,792,283 B1   9/2004   Roberts et al.
7,286,471 B2   10/2007  Kloth et al.
(Continued)

FOREIGN PATENT DOCUMENTS

EP   2487872 A1   8/2012
WO   0063791 A1   10/2000
(Continued)

OTHER PUBLICATIONS

Duran-Limon, Hector et al., "Adaptive resource management in middleware: A survey", IEEE Distributed Systems Online, IEEE Computer Society, vol. 5, Issue: 7, Jul. 2004, 13 pages.
(Continued)

*Primary Examiner* — Jay P Patel
(74) *Attorney, Agent, or Firm* — Guntin & Gust, PLC; Robert Gingher

(57) ABSTRACT

A method includes receiving, at a base station from a first mobile device, where the first data request is associated with first data of a first data type. The method includes, based on the first data type of the first data, transmitting the first data to the first mobile device. The method includes receiving, at the base station, second data, where the second data has a second data type different than the first data type. The second data is associated with a second data request originated by a second mobile device different than the first mobile device. Information associated with the second data request is received by the server from a different base station and sent to the base station based on the second data type of the
(Continued)

second data. The method also includes transmitting the second data to the second mobile device.

20 Claims, 7 Drawing Sheets

Related U.S. Application Data continuation of application No. 15/440,798, filed on Feb. 23, 2017, now Pat. No. 9,936,512, which is a continuation of application No. 14/561,637, filed on Dec. 5, 2014, now Pat. No. 9,622,145.

(51) Int. Cl.
| | |
|---|---|
| *H04W 76/40* | (2018.01) |
| *H04W 40/20* | (2009.01) |
| *H04L 5/00* | (2006.01) |
| *H04W 4/02* | (2018.01) |
| *H04W 52/24* | (2009.01) |
| *H04W 64/00* | (2009.01) |

(52) U.S. Cl.
CPC ............. *H04W 4/06* (2013.01); *H04W 40/20* (2013.01); *H04W 52/243* (2013.01); *H04W 72/042* (2013.01); *H04W 72/0453* (2013.01); *H04W 76/40* (2018.02); *H04W 64/00* (2013.01)

(58) Field of Classification Search
CPC ....... H04W 76/40; H04W 40/20; H04W 4/06; H04W 64/00; H04L 5/0007
See application file for complete search history.

(56) References Cited

U.S. PATENT DOCUMENTS

| | | | |
|---|---|---|---|
| 7,495,608 B1 | 2/2009 | Chen et al. | |
| 7,996,876 B1 | 8/2011 | Everson et al. | |
| 8,125,946 B2 | 2/2012 | Csapo | |
| 8,243,679 B1 | 8/2012 | Huang et al. | |
| 8,311,536 B1 | 11/2012 | Pulugurta | |
| 8,325,674 B2 | 12/2012 | Livanos | |
| 8,452,302 B2 | 5/2013 | Rahman et al. | |
| 8,521,141 B2 | 8/2013 | Aguirre et al. | |
| 8,666,425 B2 | 3/2014 | Ma et al. | |
| 8,719,414 B2 | 5/2014 | Rooks et al. | |
| 8,755,342 B2 | 6/2014 | Iyer et al. | |
| 8,775,631 B2 | 7/2014 | Luna | |
| 8,811,299 B2 | 8/2014 | Zhu | |
| 9,072,034 B2 | 6/2015 | Hossain | |
| 9,661,567 B2 * | 5/2017 | Lu | H04W 48/20 |
| 9,749,814 B2 * | 8/2017 | Kim | H04W 28/18 |
| 10,172,010 B2 * | 1/2019 | Teng | H04W 72/04 |
| 2002/0133589 A1 | 9/2002 | Gubbi et al. | |
| 2006/0217113 A1 | 9/2006 | Rao et al. | |
| 2008/0002672 A1 | 1/2008 | Lin | |
| 2008/0062988 A1 | 3/2008 | Daigle | |
| 2008/0218531 A1 | 9/2008 | Chou et al. | |
| 2008/0253335 A1 | 10/2008 | Bosch et al. | |
| 2008/0270866 A1 * | 10/2008 | Choi | H04L 1/1825 714/748 |
| 2009/0023460 A1 | 1/2009 | Cho et al. | |
| 2009/0069019 A1 | 3/2009 | Hayama et al. | |
| 2009/0122707 A1 | 5/2009 | Weinman | |
| 2009/0180428 A1 | 7/2009 | Viswanath | |
| 2009/0180429 A1 | 7/2009 | Stevens et al. | |
| 2010/0056159 A1 | 3/2010 | Liu et al. | |
| 2010/0056217 A1 | 3/2010 | Montojo et al. | |
| 2010/0120449 A1 | 5/2010 | Jakorinne et al. | |
| 2010/0123626 A1 | 5/2010 | Yano | |
| 2010/0261467 A1 | 10/2010 | Lin et al. | |
| 2010/0272218 A1 | 10/2010 | Yeh et al. | |
| 2011/0171974 A1 | 7/2011 | Kim et al. | |
| 2011/0287768 A1 | 11/2011 | Takamatsu et al. | |
| 2011/0292823 A1 | 12/2011 | Barbieri et al. | |
| 2012/0013748 A1 | 1/2012 | Stanwood et al. | |
| 2012/0163224 A1 | 6/2012 | Long | |
| 2012/0203822 A1 | 8/2012 | Floyd et al. | |
| 2012/0208571 A1 | 8/2012 | Park et al. | |
| 2013/0023232 A1 | 1/2013 | Mendiola | |
| 2013/0051298 A1 * | 2/2013 | Drevo | H04W 36/00835 370/312 |
| 2013/0137438 A1 | 5/2013 | Serravalle et al. | |
| 2013/0188547 A1 * | 7/2013 | Moriwaki | H04W 28/06 370/312 |
| 2013/0272121 A1 | 10/2013 | Stanwood et al. | |
| 2013/0301552 A1 | 11/2013 | Xu et al. | |
| 2014/0028785 A1 | 1/2014 | Valentine et al. | |
| 2014/0140260 A1 * | 5/2014 | Wang | H04W 36/0007 370/312 |
| 2014/0241333 A1 * | 8/2014 | Kim | H04W 48/16 370/338 |
| 2014/0247717 A1 * | 9/2014 | Jamadagni | H04W 36/22 370/230 |
| 2014/0248890 A1 | 9/2014 | Amirijoo et al. | |
| 2014/0269564 A1 | 9/2014 | Tie et al. | |
| 2014/0321372 A1 | 10/2014 | Li et al. | |
| 2015/0023243 A1 * | 1/2015 | Liu | H04L 51/38 370/312 |
| 2015/0117230 A1 * | 4/2015 | Cui | H04W 28/0284 370/252 |
| 2015/0181373 A1 | 6/2015 | Xie et al. | |
| 2015/0245176 A1 | 8/2015 | Venkatraman et al. | |
| 2015/0271749 A1 | 9/2015 | Lu et al. | |
| 2015/0295976 A1 * | 10/2015 | Lee | H04L 65/4084 709/219 |
| 2015/0304375 A1 | 10/2015 | Dhillon | |
| 2016/0014572 A1 * | 1/2016 | Vetter | H04L 69/167 370/312 |
| 2016/0127230 A1 * | 5/2016 | Cui | H04W 40/02 370/389 |
| 2016/0127889 A1 * | 5/2016 | Cui | H04W 4/02 370/328 |
| 2016/0127945 A1 * | 5/2016 | Cui | H04W 48/18 370/329 |
| 2016/0212595 A1 * | 7/2016 | Fukuta | H04W 4/06 |
| 2016/0295298 A1 * | 10/2016 | Lee | H04N 21/8456 |
| 2017/0223698 A1 * | 8/2017 | Niu | H04W 28/08 |
| 2021/0168726 A1 * | 6/2021 | MolavianJazi | H04W 52/54 |

FOREIGN PATENT DOCUMENTS

| | | | | |
|---|---|---|---|---|
| WO | WO-2013048175 A1 * | 4/2013 | ........ | H04W 28/0247 |
| WO | 2013073924 A1 | 5/2013 | | |
| WO | 2013122569 A1 | 8/2013 | | |

OTHER PUBLICATIONS

Jin, et al., "Common Radio Resource Management for Access Selection in Multi-Access Networks", IEEE, 2008 IEEE Radio and Wireless Symposium, 2008, 4 pages.

Krasniqi, B. et al., "Sum-rate maximization by bandwidth re-allocation for two users in partial frequency reuse cellular networks", Asilomar 2010, GlobeCom Workshops (GC Workshops), 2010 IEEE, 2010, pp. 814-818.

Mecklenbrauker, Christoph et al., "Partial Frequency Reuse for Long Term Evolution", Dissertation, Institute of Telecommunication, Dec. 2011, 110 pages.

Nishioka, Jun et al., "Availability Constrained Traffic Control for AMC-Enabled Wireless Mobile Backhaul Networks", World Telecommunications Congress (WTC), 2012, Mar. 2012, 18 pages.

Ruppelt, C. et al., "Intermediate Design of the Mevico Traffic Engineering Architecture", Aug. 27, 2012, 133 pages.

* cited by examiner

WIRELESS NETWORK ARCHITECTURE FOR PROVIDING MEDIA CONTENT

PRIORITY CLAIM

The present application claims priority from, and is a continuation of, U.S. patent application Ser. No. 15/934,398, filed Mar. 23, 2018, which is a continuation of U.S. patent application Ser. No. 15/440,798, filed Feb. 23, 2017, now U.S. Pat. No. 9,936,512 which is a continuation of U.S. patent application Ser. No. 14/561,637, filed Dec. 5, 2014, now U.S. Pat. No. 9,622,145, each of which is hereby incorporated by reference in its entirety.

FIELD OF THE DISCLOSURE

The present disclosure is generally related to wireless communications.

BACKGROUND

Conventional television broadcasts are transmitted via designated frequency spectrums. For example, the Federal Communications Commission (FCC) has designated certain frequency spectrums (e.g., frequency bands) for television stations to broadcast television content. Conventional television broadcasts may be inefficient, as transmission resources are used to broadcast the television content regardless of a number of consumers that are watching the broadcast.

DETAILED DESCRIPTION

Figure 1:
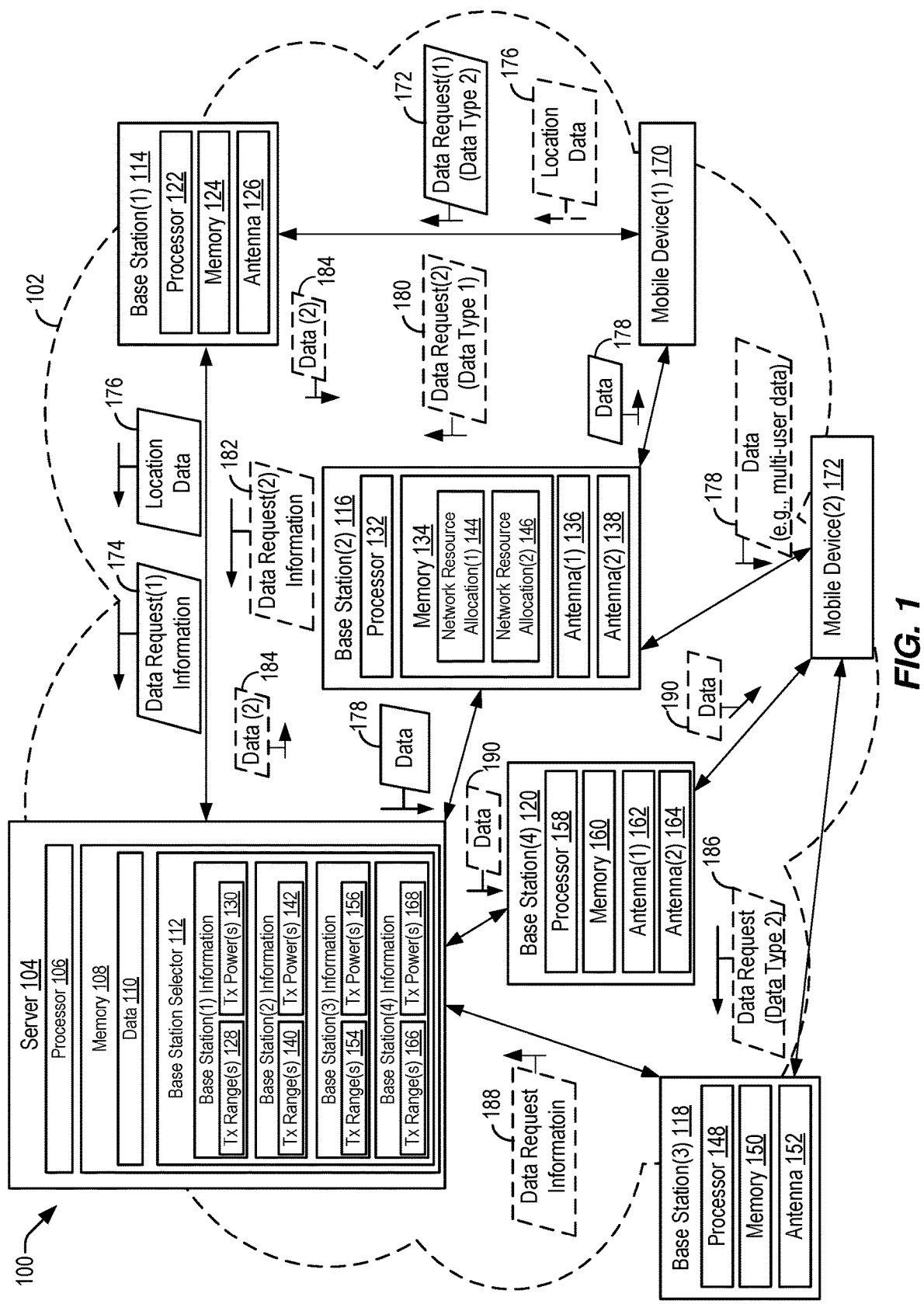
FIG. 1 is a diagram of a particular embodiment of a system for selectively providing data to mobile device(s) of a wireless communication network via particular base station(s) selected based on a data type of data associated with a data request and a location of a mobile device that originated the data request.

Cellular network providers may be capable of broadcasting television content. As one example, a cellular network provider may reallocate a portion of a frequency spectrum that is designated for voice and/or data communications to the broadcasting of television content (e.g., at a designated time after a "busy time" for voice and/or data communications). However, if few (or no) customers are watching the television broadcasts, the reallocation of the portion of the frequency spectrum may be inefficient. Instead, the network resources that are used to provide the television broadcasts may be more efficiently used to provide voice and/or data communications.

The present disclosure describes a network architecture for a wireless communication network (e.g., a cellular network) in which network resources (for providing voice and/or data communications to mobile devices) may be selectively allocated for providing media content to the mobile devices. The network architecture may adaptively respond to requests for media content (e.g., multimedia data corresponding to broadcast media content, on-demand media content, etc.) by allocating a portion of network resources to servicing the requests for the media content while retaining some network resources for providing voice and/or data communications. For example, a frequency spectrum that is allocated to a service provider includes a group of channels, and individual channels include subcarriers that represent resource blocks. In this case, allocating network resources may include allocating a particular number of resource blocks (a group of subcarriers) in a channel to servicing requests for media content. The network architecture may enable the service provider (e.g., a wireless communications service provider) to more efficiently use network resources to provide media content to mobile devices and to provide voice and/or data communications to mobile devices.

A network node (e.g., a base station) may operate in accordance with one or more wireless communication standards to provide voice and/or data communications to mobile devices via a network. To illustrate, in the context of wireless communications based on a Long Term Evolution (LTE) standard, a base station may be referred to as an "eNode B" node. For example, the network node may include a transmission tower of a wireless communications network, such as a cellular network. One or more network nodes of the wireless communication network may be designated as cellular broadcast towers (CBTs) that may be configured to support voice and/or data communications as well as asymmetric media content transmissions. For example, in an LTE network, one or more network nodes (e.g., one or more eNode B nodes) may transmit data via one or more multimedia broadcast multicast service (MBMS) transmissions (e.g., one or more enhanced MBMS (eM-BMS) transmissions). A network node (e.g., one of the CBTs) may receive requests for media content from the mobile devices and may adaptively respond to the requests. To illustrate, the network node may receive a request for media content from a mobile device. The request for media content may be received via an uplink (UL) channel that is used for providing voice and/or data communications via the network node.

The network node may allocate a portion of network resources to media content transmissions. For example, the network may operate using orthogonal frequency division multiplexing (OFDM), and a group of OFDM resource blocks may be reserved for performing the voice and/or data communications via the network. The network node may allocate a first portion of the network resources (e.g., a subset of the group of OFDM resource blocks) to media content transmissions instead of providing the voice and/or data communications. After the allocation, the network node may transmit the media content to the mobile device via the first portion of the network resources. Remaining network resources (e.g., a remainder of the OFDM resource blocks) may be used for providing the voice and/or data communications, or for providing other content to other mobile devices.

An application (e.g., a media player) at the mobile device may determine that the media content has completed (or is otherwise no longer being displayed) and may send a signal (e.g., a termination message) to the network node. Responsive to receiving the termination message, the network node may terminate transmission of the media content and may de-allocate the portion of the network resources (e.g., the subset of the group of OFDM resource blocks) for media content transmissions and re-allocate the portion of the network resources to provide voice and/or data communications. In this manner, network resources may be used for transmitting the media content on an "as-needed" basis, and network resources may be re-allocated in response to receiving termination message(s) from mobile device(s) that requested the media content. In a particular embodiment, the network node may not provide the media content until a particular number of mobile devices have requested the media content. For example, the network node may receive multiple requests for the media content from multiple mobile devices, and when a count of the multiple mobile devices exceeds a threshold value, the network node may provide the media content to the multiple mobile devices.

The media content may be transmitted at a higher transmission power than the voice and/or data communications. For example, the network node may transmit the media content at a first transmission power that is higher than a second transmission power associated with the voice and/or data communications. In a particular embodiment, the first transmission power may be set to a maximum equivalent isotropically radiated power (EIRP) permitted by the FCC. Transmitting the media data at the first transmission power (e.g., the higher transmission power) may enable the media data to be provided to mobile devices that are outside of a transmission range for voice and/or data communications. Additionally, an antenna of the network node may be mounted higher on the transmission tower than an antenna of a conventional cellular transmission tower, which may further extend a range that the network node is able to provide the media content. If the mobile device that requests the media content is outside of a voice and/or data communications range of the network node, the mobile device may transmit the request to a second network node (e.g., a conventional network node), and the second network node may forward the request to the network node that provides the media content.

The first transmission power (e.g., the transmission power associated with transmitting the media content) and/or the portion of the network resources may be selected to reduce interference (e.g., co-channel interference) with voice and/or data communications in other cells. For example, the first transmission power and/or the portion of the network resources may be selected in accordance with an intercell interference control scheme associated with a wireless communication standard. In a particular embodiment, the wireless communication standard is a long-term evolution (LTE) standard. For example, network nodes in an LTE network (referred to as "eNode B" nodes in the context of the LTE standard) are configured to reduce interference in accordance with an intercell interference control (ICIC) scheme or an enhanced ICIC (eICIC) scheme (in the context of the LTE-Advanced standard), and the network node (e.g., an eNode B scheduler) may select the first transmission power and/or the portion of the network resources in accordance with these preprogrammed ICIC or eICIC schemes. Such a selection of the first transmission power and/or the portion of the network resources may reduce degradation of voice and/or data communications in neighboring cells due to transmission of the media content. Additionally, the portion of the network resources may correspond to a set of LTE resource blocks (e.g., individual resource blocks that have a total size of 180 kHz in a frequency domain and 0.5 ms in a time domain).

In a particular embodiment, a method includes receiving information associated with a first data request from a first base station at a server of a wireless communication network. The first data request is received at the first base station from a first mobile device. The method includes selecting a second base station to transmit data responsive to the first data request to the first mobile device based on a data type of the data (e.g., a request for media content or a request for non-media content) and based on a location of the first mobile device. The method further includes transmitting the data from the server to the second base station.

In another particular embodiment, a server includes a processor and a memory. The memory is coupled to the processor and stores instructions that are executable by the processor to perform operations. The operations include receiving information associated with a data request from a first base station, where the data request is received at the first base station from a first mobile device. The operations also include selecting a second base station to transmit data responsive to the data request to the first mobile device based on a data type of the data (e.g., a request for media content or a request for non-media content) and based on a location of the first mobile device. The operations further include transmitting the data to the second base station.

In another particular embodiment, a base station includes a first antenna, a second antenna, a processor, and a memory coupled to the processor. The memory stores instructions that are executable by the processor to perform various operations. The operations may include receiving a first data request associated with data of a first data type from a first mobile device via the first antenna and transmitting first data to the first mobile device via the first antenna based on the first data request. The operations may also include receiving second data from a server. The second data is associated with a second data request associated with data of a second data type that is originated by a second mobile device and that is received by the server from a different base station. The operations further include transmitting the second data to the second mobile device via the second antenna.

Referring to FIG. 1, a particular embodiment of a system of wireless communications is illustrated and generally designated 100. FIG. 1 illustrates a particular example of a wireless communication network 102 that includes a server 104 and multiple base stations for providing wireless communication service(s) to one or more mobile devices. The server 104 may select a base station to provide data responsive to a data request from a mobile device based at least in part on information associated with the data request (e.g., a type of data that is requested, such as media content) and based on a location of the mobile device.

The server 104 includes a processor 106 and a memory 108 that is communicatively coupled to the processor 106. In the example of FIG. 1, the memory 108 stores data 110 (e.g., locations associated with individual base stations of the wireless communication network 102) and a base station selector 112 that is configured to select a particular base station for communication with a particular mobile device based on information (e.g., one or more transmission ranges and/or one or more transmission powers) associated with individual base stations of the wireless communication network 102. In the illustrative example of FIG. 1, the wireless communication network 102 includes a first base station 114, a second base station 116, a third base station 118, and a fourth base station 120. In alternative embodiments, the wireless communication network 102 may include more than four base stations or less than four base stations.

The first base station 114 includes a processor 122, a memory 124, and an antenna 126. A transmission range 128 and a transmission power 130 may be associated with the first base station 114, and the server 104 may store the transmission range 128 and the transmission power 130 associated with the first base station 114 in the memory 108 as the first base station information.

In the particular embodiment illustrated in FIG. 1, the second base station 116 includes a processor 132, a memory 134, a first antenna 136, and a second antenna 138. A first transmission range and a first transmission power may be associated with the first antenna 136, and a second transmission range and a second transmission power may be associated with the second antenna 138. The server 104 may store the individual transmission ranges 140 and the individual transmission powers 142 associated with the first antenna 136 and the second antenna 138 of the second base station 116 in the memory 108 as the second base station information.

A frequency spectrum may be associated with voice communications and data communications in the wireless communication network 102. The frequency spectrum may represent network resources that are allocated to a particular service provider that is associated with the wireless communication network 102. The frequency spectrum may include a group of channels, and individual channels include subcarriers that represent resource blocks (e.g., LTE resource blocks in the context of communications based on the LTE standard). FIG. 1 illustrates that the second base station 116 is configured to (dynamically) allocate a first portion of the network resources (e.g., a first number of resource blocks) to transmission of data responsive to data requests for data of a first data type and to store allocation information in the memory 134 as a first network resource allocation 144. The second base station 116 is configured to (dynamically) allocate a second portion of the network resources (e.g., a second number of resource blocks) to transmission of data responsive to data requests for data of a second data type and to store allocation information in the memory 134 as a second network resource allocation 146. To illustrate, the first data type may represent voice and/or data communications, and the second data type may represent media content, such as broadcast media content, on-demand media content, or a combination thereof.

In the particular embodiment illustrated in FIG. 1, the second base station 116 is configured to transmit data of the first data type (e.g., voice and/or other non-media content) via the first antenna 136, and the second base station 116 is configured to transmit data of the second data type (e.g., media content) via the second antenna 138. The second antenna 138 may transmit data of the second data type at a transmission power that is greater than a transmission power associated with the first antenna 136 that transmits data of the first data type. For example, the second base station 116 may transmit the data of the second data type (e.g., media content) via the second antenna 138 at a transmission power at a maximum equivalent isotropically radiated power (EIRP) permitted by the FCC. Transmitting the data of the second data type at a higher transmission power may allow the second base station 116 to provide the data (media content) to mobile devices that may be outside a voice and/or data communications range of another base station (e.g., the second base station 116) that may represent a network node of the wireless communication network 102 that is designated for providing media content. To illustrate, the first base station 114 may receive a request for media content, the first base station 114 may transmit information associated with the request for media content to the server 104, and the server 104 may forward the request to the second base station 116 (that is designated as a network node for providing media content). In some cases, a position of the second antenna 138 may be located at a higher elevation than the first antenna 136. As an example, the second antenna 138 may be mounted higher on a transmission tower associated with the second base station 116 than the first antenna 136. Mounting the second antenna 138 higher on the transmission tower may extend a range that the second base station 116 is able to provide data of the second data type (e.g., media content).

Figure 2:
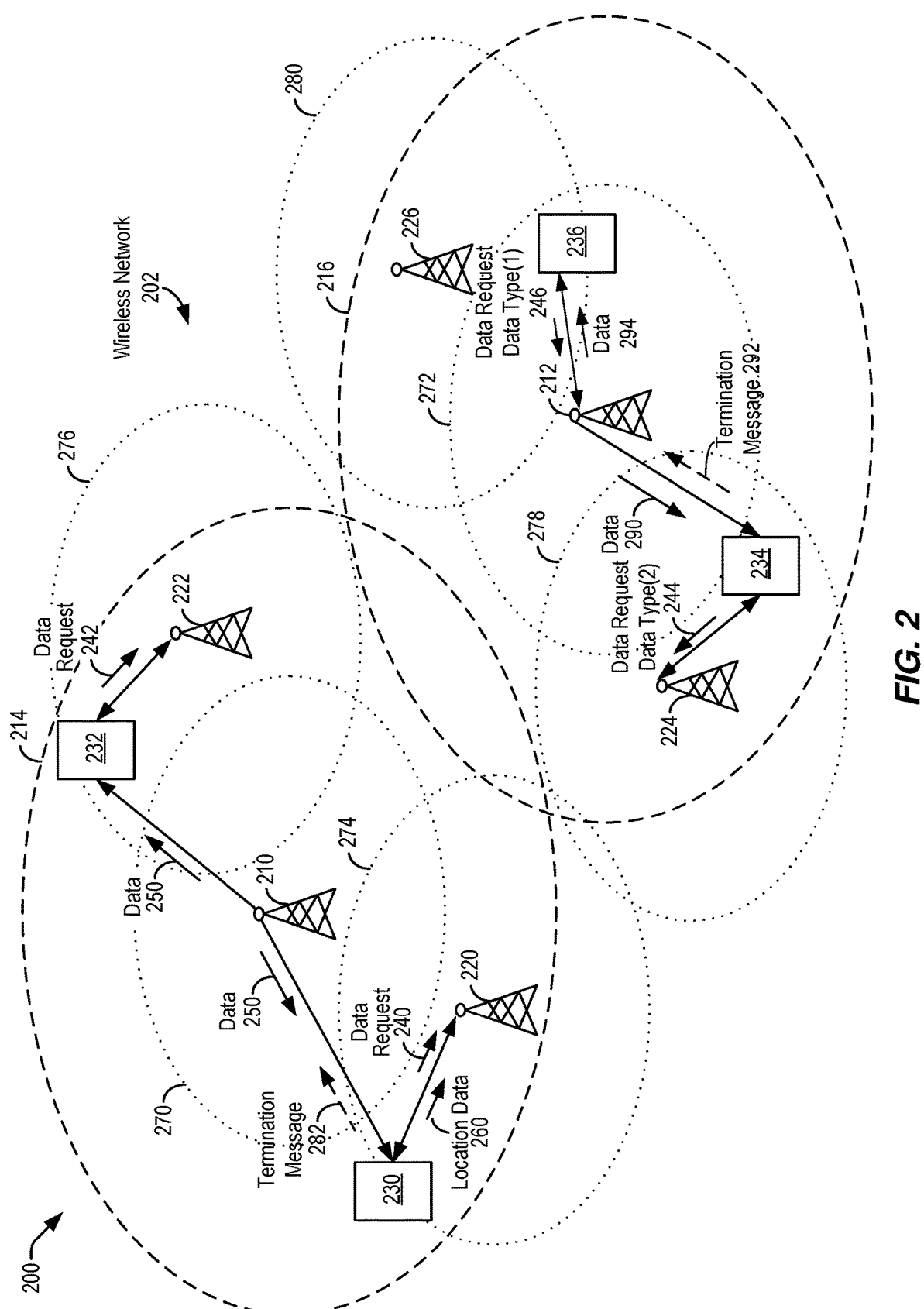
FIG. 2 is a diagram of another embodiment of a system for selectively providing data to mobile device(s) of a wireless network via particular base station(s) selected based on a data type of data associated with a data request and a location of a mobile device that originated the data request.

In some embodiments, the transmission power associated with the second antenna 138 and/or the portion of the network resources allocated to providing data of the second data type (i.e., the second network resource allocation 146) may be selected to reduce interference with voice and/or data communications in other cells (e.g., a cell associated with the first base station 114), as described further herein with respect to FIG. 2. For example, the first transmission power and/or the portion of the network resources may be selected in accordance with an intercell interference control scheme associated with a wireless communication standard. In a particular embodiment, the wireless communication standard is an LTE standard. For example, network nodes in an LTE network are configured to reduce interference in accordance with an ICIC scheme or an eICIC scheme, and the network node (i.e., the second base station 116 in this example, referred to as "eNode B" in an LTE context) may select the first transmission power and/or the portion of the frequency spectrum in accordance with these preprogrammed ICIC or eICIC schemes. Such a selection of the first transmission power and/or the portion of the network resources may reduce degradation of voice and/or data communications in neighboring cells due to transmission of the media content.

FIG. 1 further illustrates that the third base station 118 includes a processor 148, a memory 150, and an antenna 152. A transmission range 154 and a transmission power 156 may be associated with the third base station 118, and the server 104 may store the transmission range 154 and the transmission power 156 associated with the third base station 118 in the memory 108 as the third base station information. Further, in the particular embodiment illustrated in FIG. 1, the fourth base station 120 includes a processor 158, a memory 160, a first antenna 162, and a second antenna 164. A first transmission range and a first transmission power may be associated with the first antenna 162, and a second transmission range and a second transmission power may be associated with the second antenna 164. The server 104 may store the individual transmission ranges 166 and the individual transmission powers 168 associated with the first antenna 162 and the second antenna 164 of the fourth base station 120 in the memory 108 as the fourth base station information. In some embodiments, as described previously with respect to the second base station 116, the fourth base station 120 may be configured to (dynamically) allocate a portion of network resources (that may be reserved for voice and/or data communications) to transmission of data responsive to data requests for data of a second data type (e.g., media content). While not shown in FIG. 1, the fourth base station 120 may store the dynamically allocated network resource allocation information in the memory 160. The fourth base station 120 is further configured to (dynamically) allocate another portion of the network resources to transmission of data responsive to data requests for data of a first data type (e.g., voice and/or other non-media content). While not shown in FIG. 1, the fourth base station 120 may store the dynamically allocated network resource allocation information in the memory 160.

In the particular embodiment illustrated in FIG. 1, the fourth base station 120 is configured to transmit data of the first data type (e.g., voice and/or other non-media content) via the first antenna 162, and the fourth base station 120 is configured to transmit data of the second data type (e.g., media content) via the second antenna 164. The second antenna 164 may transmit data of the second data type at a transmission power that is greater than a transmission power associated with the first antenna 162 transmitting data of the first data type. For example, the fourth base station 120 may transmit the data of the second data type (e.g., media content) via the second antenna 164 at a transmission power at a maximum EIRP permitted by the FCC. Transmitting the data of the second data type at a higher transmission power may allow the fourth base station 120 to provide media content to mobile devices that may be outside a voice and/or data communications range associated with the first antenna 162. In some cases, a position of the second antenna 164 may be located at a higher elevation than the first antenna 162. That is, the second antenna 164 may be mounted higher on a transmission tower associated with the fourth base station 120 than the first antenna 162. Mounting the second antenna 164 higher on the transmission tower may extend a range that the fourth base station 120 is able to provide data of the second data type (e.g., multimedia data).

In some embodiments, the transmission power associated with the second antenna 164 and/or the portion of the network resources allocated to providing data of the second data type may be selected to reduce interference with voice and/or data communications in other cells (e.g., a cell associated with the third base station 118), as described further herein with respect to FIG. 2. For example, the first transmission power and/or the portion of the network resources may be selected in accordance with an intercell interference control scheme associated with a wireless communication standard (e.g., an LTE standard). Such a selection of the first transmission power and/or the portion of the network resources may reduce degradation of voice and/or data communications in neighboring cells due to transmission of the media content.

FIG. 1 further illustrates a particular example in which a first mobile device 170 and a second mobile device 172 may communicate with one or more base stations of the wireless communication network 102. In other embodiments, alternative numbers and/or types of mobile devices may communicate with base station(s) of the wireless communication network 102. In the example of FIG. 1, the first mobile device 170 generates a first data request 172 and sends the first data request 172 to the first base station 114. The first base station 114 is configured to send information 174 associated with the first data request 172 to the server 104.

The server 104 is configured to receive the information 174 associated with the first data request 172 and to receive location data 176 from the first base station 114. In some cases, the first base station 114 may be configured to determine a location of the first mobile device 170 and to provide the location information to the server 104 as the location data 176 (e.g., in conjunction with the information 174 associated with the first data request 172). In other cases (as illustrated by the dashed lines of FIG. 1), the first mobile device 170 may provide the location data 176 (e.g., Global Positioning System (GPS) coordinates or other location identification information) to the first base station 114, and the first base station 114 may send the location data 176 received from the first mobile device 170 to the server 104.

The server 104 is configured to determine the location of the first mobile device 170 based on the location data 176 and to select, using the base station selector 112, a particular base station to transmit data 178 to the first mobile device 170 based on the first data request 172 and based on the location of the first mobile device 170. The server 104 is further configured to transmit the data 178 to the selected base station. FIG. 1 illustrates a particular example in which the base station selector 112 selects the second base station 116 to transmit the data 178 to the first mobile device 170, and the server 104 transmits the data 178 to the second base station 116.

In a particular embodiment, the base station selector 112 may compare the location of the first mobile device 170 to transmission range and/or transmission power information that is stored in the memory 108 for the individual base stations of the wireless communication network 102. To illustrate, the base station selector 112 may compare the location of the first mobile device 170 to the transmission range 128 of the first base station 114, to the transmission ranges 140 of the first antenna 136 and the second antenna 138 of the second base station 116, to the transmission range 154 of the third base station 118, to the transmission ranges 166 of the first antenna 162 and the second antenna 164 of the fourth base station 120, or a combination thereof. The server 104 may select the second base station 116 in response to determining that the first mobile device 170 is located within a particular transmission range of the second antenna 138 of the second base station 116.

In a particular embodiment, the server 104 may select the second base station 116 based on a data type of data associated with the first data request 172. In the example of FIG. 1, the second base station 116 may be associated with transmission of data of a particular data type (e.g., media content). That is, the second base station 116 may represent a cellular broadcast tower (CBT) of one or more CBTs of the wireless communication network 102 that is capable of transmitting data at a higher transmission power. In FIG. 1, the data type associated with data of the first data request 172 is identified as a second data type (e.g., media content). In some cases, the data 178 may include multimedia data corresponding to broadcast media content or on-demand media content. To illustrate, the multimedia data may include broadcast television content that may be received at the server 104 from a media provider. As another example, on-demand media content may be stored at the server 104 (e.g., in the memory 108) or may be accessible to the server 104 via one or more networks. The data 178 may be transmitted from the second base station 116 to the first mobile device 170 at a higher transmission power than other data (e.g., voice or other non-media content) that is transmitted from the first base station 116. To illustrate, the second antenna 138 of the second base station 116 may transmit the data 178 to the first mobile device 170 at a transmission power that is higher than the transmission power 130 of the antenna 126 of the first base station 114.

The second base station 116 may allocate a first portion of the network resources to transmission of data responsive to data requests for data of a first data type (e.g., voice and/or data communications) and may allocate a second portion of the network resources to transmission of data responsive to data requests for data of the second data type (e.g., media content). The second base station 116 may allocate the first portion of the network resources and the second portion of the network resources on an "as-needed" basis. As an example, the second base station 116 may allocate the first portion of the network resources and the second portion of the network resources in response to determining that the requested data (i.e., the data 178) is associated with the second data type (e.g., media content). In a particular embodiment, the second base station 116 selects the first portion, the second portion, a transmission power associated with transmitting data associated with the first data type, a transmission power associated with transmitting data associated with the second data type, or a combination thereof, in accordance with an intercell interference control scheme associated with a wireless communication protocol (e.g., an LTE protocol). In some cases, the second base station 116 may use orthogonal frequency division multiplexing (OFDM) to transmit data associated with the first data type (e.g., via the first antenna 136) and to transmit data (e.g., the data 178) associated with the second data type (e.g., via the second antenna 136).

In the example illustrated in FIG. 1, the second base station 116 stores network resource allocation information in the memory 134 as the first network resource allocation 144 and the second network resource allocation 146. In some cases, the second antenna 138 of the second base station 116 may also transmit the data 178 via a particular frequency band that is outside of a frequency spectrum that is specified for downlink communications. As an example, an RF spectrum (e.g., Band 29) may be designated for one-way communications. Another RF spectrum that is designated for two-way communications (e.g., a low band spectrum such as Band 5) may also be used, and surrounding cellular sites may be signaled to not use specific frequency bands so that media content may be transmitted from a network node designated as a CBT (e.g., the second base station 116). FIG. 1 further illustrates that, in some cases, the data 178 may include multi-user data, and the data 178 may be transmitted to the first mobile device 170 and to one or more other mobile devices (e.g., the second mobile device 172) via a multi-cast transmission from the second base station 116.

In the particular embodiment illustrated in FIG. 1, the first mobile device 170 may send a second data request 180 to the first base station 114. The server 104 may be configured to receive information 182 associated with the second data request 180 (along with the location data 176) from the first base station 114. FIG. 1 illustrates an example in which the base station selector 112 at the server 104 selects the first base station 114 to transmit second data 184 to the first mobile device 170 based on a determination that the second data request 180 and the first data request 174 are associated with data of different data types. For example, the first data request 174 may be associated with media content (e.g., broadcast media content, on-demand media content, or a combination thereof), while the second data request 180 may be associated with voice and/or data communications. As shown in FIG. 1, the server 104 may transmit the second data 184 to the first base station 114, and the first base station 114 may transmit the second data 184 to the first mobile device 170.

As another example, FIG. 1 illustrates that the second mobile device 172 may send a data request 186 (e.g., for data of the second data type) to the third base station 118. The server 104 may receive information 188 associated with the data request 186 from the third base station 118. FIG. 1 illustrates an example in which the base station selector 112 at the server 104 selects the fourth base station 120 to transmit data 190 to the second mobile device 172 based on the data request 186 and based on a location of the second mobile device 172. In some cases, the fourth base station 120 may be selected in response to the server 104 determining that the location of the second mobile device 172 is outside of a transmission range of the first antenna 162 of the fourth base station 120 but within a transmission range of the second antenna 164 of the fourth base station 120. The server 104 may send data 190 to the fourth base station 120, and the fourth base station 120 may send the data 190 to the second mobile device 172.

While not illustrated in FIG. 1, in some cases, the server 104 may be configured to receive updated location data associated with the first mobile device 170 from another base station (e.g., a base station other than the first base station 114). As an illustrative, non-limiting example, the first mobile device 170 may roam from a coverage area associated with the first base station 114 to a coverage area associated with the third base station 118. In this case, the third base station 118 may determine updated location data for the first mobile device 170, or the first mobile device 170 may provide the updated location data to the third base station 118. The third base station 118 may send the updated location data to the server 104. Based on the updated location data, the base station selector 112 at the server 104 may select the fourth base station 120 to transmit the data 178 to the first mobile device 170. In response to selecting the fourth base station 120, the server 104 may transmit the data 178 to the fourth base station 120 and may terminate transmission of the data 178 to the second base station 116.

Thus, FIG. 1 illustrates a system for selectively providing data to mobile device(s) of the wireless communication network 102 via particular base station(s) that are selected by the server 104 based on a particular data request and a location of a particular mobile device. In FIG. 1, a base station (e.g., a scheduler at the second base station 116) may dynamically allocate a portion of network resources to transmission of data responsive to data requests for data of a first data type (e.g., voice and/or data communications) and another portion of the network resources to transmission of data responsive to data requests for data of a second data type (e.g., media content). That is, FIG. 1 illustrates a network architecture that may adaptively respond to requests for media content by allocating a portion of network resources to servicing requests for the media content while retaining some network resources for providing voice and/or data communications. The network architecture may enable a service provider (e.g., a wireless communications service provider) to efficiently use network resources to provide media content to mobile devices and to provide voice and/or data communications to mobile devices.

FIG. 2 illustrates a particular embodiment of a system 200 for selectively providing data to mobile device(s) of a wireless network via particular base station(s) selected based on a particular data request and a location of a particular mobile device. In FIG. 2, multiple base stations associated with a wireless network 202 are illustrated. Some base stations of the wireless network 202 may include multiple antennas that may have different transmission powers corresponding to different transmission ranges.

In the particular embodiment illustrated in FIG. 2, the multiple base stations of the wireless network 202 include a first base station 210 and a second base station 212. A first transmission range 214 may be associated with one antenna of the first base station 210. Further, a first transmission range 216 may be associated with one antenna of the second base station 212. FIG. 2 further illustrates other base stations of the wireless network 202 that may be capable of providing voice and/or data communications to mobile device(s) within a transmission range of the particular base station. In FIG. 2, the other base stations include a third base station 220, a fourth base station 222, a fifth base station 224, and a sixth base station 226. In other embodiments, an alternative number and/or arrangement of base stations may be included in the wireless network 202.

FIG. 2 further illustrates multiple mobile devices that may communicate via one or more base stations of the wireless network 202. In the particular embodiment illustrated in FIG. 2, the multiple mobile devices include a first mobile device 230, a second mobile device 232, a third mobile device 234, and a fourth mobile device 236. In other embodiments, an alternative number of mobile devices and/or locations of particular mobile devices may be included in the wireless network 202.

FIG. 2 illustrates one example in which the first mobile device 230 sends a data request 240 to the third base station 220, the second mobile device 232 sends a data request 242 to the fourth base station 222, and the third mobile device 234 sends a data request 244 (e.g., for data of a second data type) to the fifth base station 224. FIG. 2 further illustrates that the fourth mobile device 236 may send a data request 246 (e.g., for data of a first data type) to the second base station 212. In the example of FIG. 2, the first base station 210 is configured to send data 250 to the first mobile device 230 and to the second mobile device 232, while the second base station 212 is configured to send the data 290 to the third mobile device 234.

FIG. 2 further illustrates a particular embodiment in which the first mobile device 230 may send location data 260 (e.g., Global Positioning System (GPS) coordinates) to the third base station 220. Alternatively, the third base station 220 may determine the location of the first mobile device 230 (e.g., via triangulation). A server (not illustrated in FIG. 2) may be configured to select a base station to provide data responsive to a particular data request from a mobile device based at least in part on information associated with the data request (e.g., a type of data that is requested, such as media content) and based on a location of the mobile device.

FIG. 2 also illustrates that a second transmission range 270 may be associated with another antenna of the first base station 210, and a second transmission range 272 may be associated with another antenna of the second base station 212. Further, a single transmission range may be associated with the other base stations of the example wireless network 202 of FIG. 2. To illustrate, the third base station 220 may have a transmission range 274, the fourth base station 222 may have a transmission range 276, the fifth base station 224 may have a transmission range 278, and the sixth base station 226 may have a transmission range 280.

In operation, a user (e.g., a subscriber to the wireless network 202) at the first mobile device 230 may request to receive media content (e.g., television content) via the wireless network 202. In the example illustrated in FIG. 2, the first mobile device 230 is located outside of the second transmission range 270 of the first base station 210 but within the transmission range 274 of the third base station 220. The first mobile device 230 may send the data request 240 to the third base station 220. The data request 240 may correspond to a request for media content, and the first mobile device 230 may communicate the request for media content to the third base station 220 via an uplink (UL) channel that is used for providing voice and/or data communications via the third base station 220. In a particular embodiment, the third base station 220 may represent a "conventional" network node that is configured to provide voice and/or data communications, while the first base station 210 may represent a cellular broadcast tower (CBT) of the wireless network 202 that is designated as a network node to provide media content to one or more mobile devices. Accordingly, information associated with the data request 240 may be forwarded from the third base station 220 to the first base station 210 (e.g., via a server that is not shown in FIG. 2, such as the server 104 of FIG. 1).

In response to receiving the information associated with the data request 240 (corresponding to a request for media content), the first base station 210 may allocate a portion (or an additional portion) of network resources to media content transmissions. For example, the wireless network 202 may operate using OFDM, and a particular group of OFDM resource blocks may be reserved for performing voice and/or data communications via the wireless network 202. In this case, the first base station 210 may allocate a first portion of the network resources (e.g., a subset of the group of OFDM resource blocks) to media content transmissions instead of the voice and/or data communications. After the allocation, the first base station 210 may transmit data 250 (including the media content) to the first mobile device 230 via the first portion of the network resources that is dynamically allocated for media content transmissions. The first base station 210 may retain the remaining network resources (e.g., a remainder of the OFDM resource blocks) to be used for providing voice and/or data communications, or for providing other content to other mobile devices. In some cases, the first mobile device 230 may receive the data 250 (including the media content) from the first base station 210 via a downlink (DL) channel that is used for providing media content via the first base station 210.

In some cases, a transmission power (e.g., the transmission power to transmit the media content from the first base station 210 to mobile devices within the first transmission range 214) and/or the portion of the network resources may be selected to reduce interference with voice and/or data communications in other cells (e.g., cells associated with the second base station 220 and the third base station 222). For example, the first transmission power and/or the portion of the network resources may be selected in accordance with an intercell interference control scheme associated with a wireless communication standard (e.g., an LTE standard). For example, network nodes in an LTE network are configured to reduce interference in accordance with an ICIC scheme or an eICIC scheme, and the network node (e.g., the first base station 210 in this example) may select the transmission power and/or the portion of the network resources in accordance with these preprogrammed ICIC or eICIC schemes. Such a selection of the first transmission power and/or the portion of the network resources may reduce degradation of voice and/or data communications in neighboring cells (e.g., the cells associated with the second base station 220 and the third base station 222) due to transmission of the media content. Additionally, the portion of the network resources may correspond to a set of LTE resource blocks.

In the particular embodiment illustrated in FIG. 2, the first mobile device 230 may send a termination message 282 to the first base station 210 (e.g., after a media player at the first mobile device 230 determines that media content is no longer being displayed). Responsive to receiving the termination message 282, the first base station 210 may terminate transmission of the media content and may de-allocate the portion of the network resources that was previously allocated for media content transmissions (e.g., the second portion) and re-allocate the portion of the network resources to providing voice and/or data communications. In this manner, network resources may be used for transmitting the media content on an "as-needed" basis, and network resources may be re-allocated to providing voice and/or data communications when the media content is no longer being requested.

In a particular embodiment, a network node of the wireless network 202 (e.g., the first base station 210) may not provide the media content until a particular number of mobile devices have requested the media content. For example, the first base station 210 may receive multiple requests for the media content from multiple mobile devices, and when a count of the multiple mobile devices exceeds a threshold value, the first base station 210 may provide the media content to the multiple mobile devices. FIG. 2 illustrates one example in which the multiple devices requesting the media content include the first mobile device 230 and the second mobile device 232. Alternatively, more than two mobile devices may request the media content.

In a particular embodiment, a server (not shown in FIG. 2, but see e.g., the server 104 of FIG. 1) may receive information associated with multiple data requests from multiple base stations. The multiple data requests may originate at multiple mobile devices. To illustrate, the multiple data requests may correspond to the data request 240 from the first mobile device 130, the data request 242 from the second mobile device 232, and the data request 244 from the third mobile device 234. The server may determine a count of a group of mobile devices to receive data from a particular base station (e.g., the first base station 210 in FIG. 2) based on the multiple data requests and locations of the multiple mobile devices. For example, referring to FIG. 2, the server may determine that the count of the group of mobile devices to receive the data 250 from the first base station 210 corresponds to two mobile devices (i.e., the first mobile device 230 and the second mobile device 232). The data request 244 from the third mobile device 234 may be excluded from the count, as the location of the third mobile device 234 corresponds to a location that is outside of the first transmission range 214 of the first base station 210. The server may transmit an instruction to the first base station 210 to initiate transmission of the data 250 to the group of mobile devices (i.e., the first mobile device 230 and the second mobile device 232) when the count exceeds a threshold. FIG. 2 illustrates an example in which the first base station 210 transmits the data 250 to the first mobile device 230 and the second mobile device 232 (e.g., based on the count of two devices). Alternatively, the threshold may correspond to an alternative number of devices that are requesting the data 250 from the first base station 210, and the server may not transmit the instruction to initiate transmission of the data 250 until the count satisfies the threshold.

In the example illustrated in FIG. 2, the second mobile device 232 is located outside of the second transmission range 270 of the first base station 210 but within the transmission range 276 of the fourth base station 222. As such, the second mobile device 232 may send the data request 242 (corresponding to a request for the media content) to the fourth base station 222 (e.g., via an uplink channel that is used for providing voice and/or data communications via the fourth base station 222). In a particular embodiment, the fourth base station 222 may represent another "conventional" network node of the wireless network 202 that is configured to provide voice and/or data communications. Accordingly, information associated with the data request 242 may be forwarded from the fourth base station 222 to the first base station 210 (e.g., via a server that is not shown in FIG. 2, such as the server 104 of FIG. 1).

Thus, FIG. 2 illustrates one example in which the first base station 210 receives two requests for the media content (i.e., the data request 240 from the first mobile device 230 and the data request 242 from the second mobile device 232). In response, the first base station 210 may determine whether the count of mobile devices requesting the media content (i.e., two in this example) satisfies a threshold. When the first base station 210 determines that the number of mobile devices requesting the media content exceeds the threshold, the first base station 210 may determine that the media content is to be provided to the multiple mobile devices (i.e., the first mobile device 230 and the second mobile device 232 in this example). In response to determining that the threshold is satisfied, the first base station 210 may allocate a portion of network resources to media content transmissions. For example, the first base station 210 may allocate a portion of network resources (e.g., a subset of OFDM resource blocks) to media content transmissions instead of providing the voice and/or data communications. After the allocation, the first base station 210 may transmit the data 250 (including the media content) to the first mobile device 230 and to the second mobile device 232 via the portion of the network resources that is dynamically allocated for media content transmissions. The first base station 210 may retain the remaining network resources (e.g., a remainder of the OFDM resource blocks) to be used for providing voice and/or data communications, or for providing other content to other mobile devices. In some cases, the first mobile device 230 and the second mobile device 232 may receive the data 250 (including the media content) from the first base station 210 via a downlink channel that is used for providing media content via the first base station 210.

FIG. 2 illustrates that the first mobile device 230 may send the termination message 282 to the first base station 210. FIG. 2 further illustrates a particular example in which a subscriber at the second mobile device 232 may be still be viewing the media content. Accordingly, the second mobile device 232 may not have transmitted a termination message to the first base station 210. In this case, the first base station 210 may wait to receive the termination message from the second mobile device 232 before de-allocating the portion of the network resources for media content transmissions and re-allocating the portion of the network resources to providing voice and/or data communications. In this manner, network resources may be used for transmitting the media content on an "as-needed" basis, and network resources may be re-allocated when the network node (i.e., the first base station 210 in this case) determines that multiple subscribers are no longer requesting the media content (e.g., in response to receiving termination messages from each of the multiple subscribers).

FIG. 2 further illustrates that the wireless network 202 may include multiple CBTs that are designated as network nodes to provide media content to one or more mobile devices. In the example of FIG. 2, the second base station 212 may represent another CBT in addition to the first base station 210. In other cases, the wireless network 202 may include an alternative number and/or arrangement of network nodes that may be designated as CBTs to provide media content. In the embodiment illustrated in FIG. 2, the fifth base station 224 and the sixth base station 226 may represent other "conventional" network nodes that are configured to provide voice and/or data communications.

In FIG. 2, a user (e.g., a subscriber to the wireless network 202) at the third mobile device 234 may desire to receive media content (e.g., television content) via the wireless network 202. In the example illustrated in FIG. 2, the third mobile device 234 is located outside of the second transmission range 272 of the second base station 212 but within the transmission range 278 of the fifth base station 224. The third mobile device 234 may send the data request 244 (e.g., a request for media content) to the fifth base station 224. For example, the third mobile device 234 may communicate the data request 244 to the fifth base station 224 via an uplink channel that is used for providing voice and/or data communications via the fifth base station 224. As the fifth base station 224 represents a "conventional" network node in the example of FIG. 2, information associated with the data request 244 may be forwarded from the fifth base station 224 to the second base station 212 (e.g., via a server that is not shown in FIG. 2, such as the server 104 of FIG. 1).

In the embodiment illustrated in FIG. 2 the second base station 212 may receive one request for the media content from a single mobile device (i.e., the data request 244 from the third mobile device 234). The second base station 212 may represent one or more CBTs of the wireless network 202 that may provide media content to mobile device(s) without determining whether a number of mobile devices requesting the media content satisfies a threshold. In response to receiving the information associated with the data request 244 (corresponding to a request for media content), the second base station 212 may allocate a portion of network resources to media content transmissions. After the allocation, the second base station 212 may transmit data 290 (including the media content) to the third mobile device 234 via the portion of the network resources that is dynamically allocated for media content transmissions. The second base station 212 may retain the remaining network resources to be used for providing voice and/or data communications, or for providing other content to other mobile devices. In some cases, the third mobile device 234 may receive the data 290 (including the media content) from the second base station 212 via a downlink channel that is used for providing media content via the second base station 212.

In some cases, a transmission power (e.g., the transmission power to transmit the media content from the first base station 212 to mobile devices within the first transmission range 216) and/or the portion of the network resources may be selected to reduce interference with voice and/or data communications in other cells (e.g., cells associated with the fifth base station 224 and the sixth base station 226). For example, the transmission power and/or the portion of the network resources may be selected in accordance with an intercell interference control scheme associated with a wireless communication standard (e.g., an LTE standard). For example, network nodes in an LTE network are configured to reduce interference in accordance with an ICIC scheme or an eICIC scheme, and the network node (e.g., the second base station 212 in this example) may select the transmission power and/or the portion of the network resources in accordance with these preprogrammed ICIC or eICIC schemes. Such a selection of the transmission power and/or the portion of the network resources may reduce degradation of voice and/or data communications in neighboring cells (e.g., the cells associated with the fifth base station 224 and the sixth base station 226) due to transmission of the media content. Additionally, the portion of the network resources may correspond to a set of LTE resource blocks.

FIG. 2 illustrates that the third mobile device 234 may send a termination message 292 to the second base station 212. In response to receiving the termination message 292, the second base station 212 may de-allocate the portion of the network resources for media content transmissions and re-allocate the portion of the network resources to providing voice and/or data communications. In this manner, network resources may be used for transmitting the media content on an "as-needed" basis, and network resources may be re-allocated when the network node (i.e., the second base station 212 in this case) determines that subscriber(s) are no longer viewing the media content.

FIG. 2 also illustrates that a user (e.g., a subscriber to the wireless network 202) at the fourth mobile device 236 may request to utilize the wireless network 202 for voice and/or data communications. To illustrate, the fourth mobile device 236 may transmit the data request 246 to the second base station 212. The second base station 212 may receive the data request 246 from the fourth mobile device 236 via a first antenna. The second base station 212 may transmit data 294 to the fourth mobile device 236. As such, the second base station 212 is configured to receive a data request (e.g., the data request 246) for data of a first data type (e.g., non-media content) via a first antenna and to transmit data responsive to the data request 246 via the first antenna. The second base station 212 is further configured to receive second data (e.g., from a server) that is associated with a second data request originated by a second mobile device (e.g., the data request 244 transmitted from the third mobile device 234 to the fifth base station 224). The second base station 212 may transmit the data 290 to the third mobile device 234 via a second antenna.

Thus, FIG. 2 illustrates a system for selectively providing data to mobile device(s) of the wireless network 202 via particular base station(s) selected based on a particular data request and a location of a particular mobile device. In the wireless network 202 illustrated in FIG. 2, the first base station 210 and the second base station 212 represent CBTs that are designated as network nodes to provide media content to one or more mobile devices. The CBTs may selectively allocate or de-allocate a portion of network resources to media content transmissions on an "as needed" basis. The CBTs may retain the remaining network resources to be used for providing voice and/or data communications (e.g., for providing the data 294 to the fourth mobile device 236), or for providing other content to other mobile devices.

Figure 3:
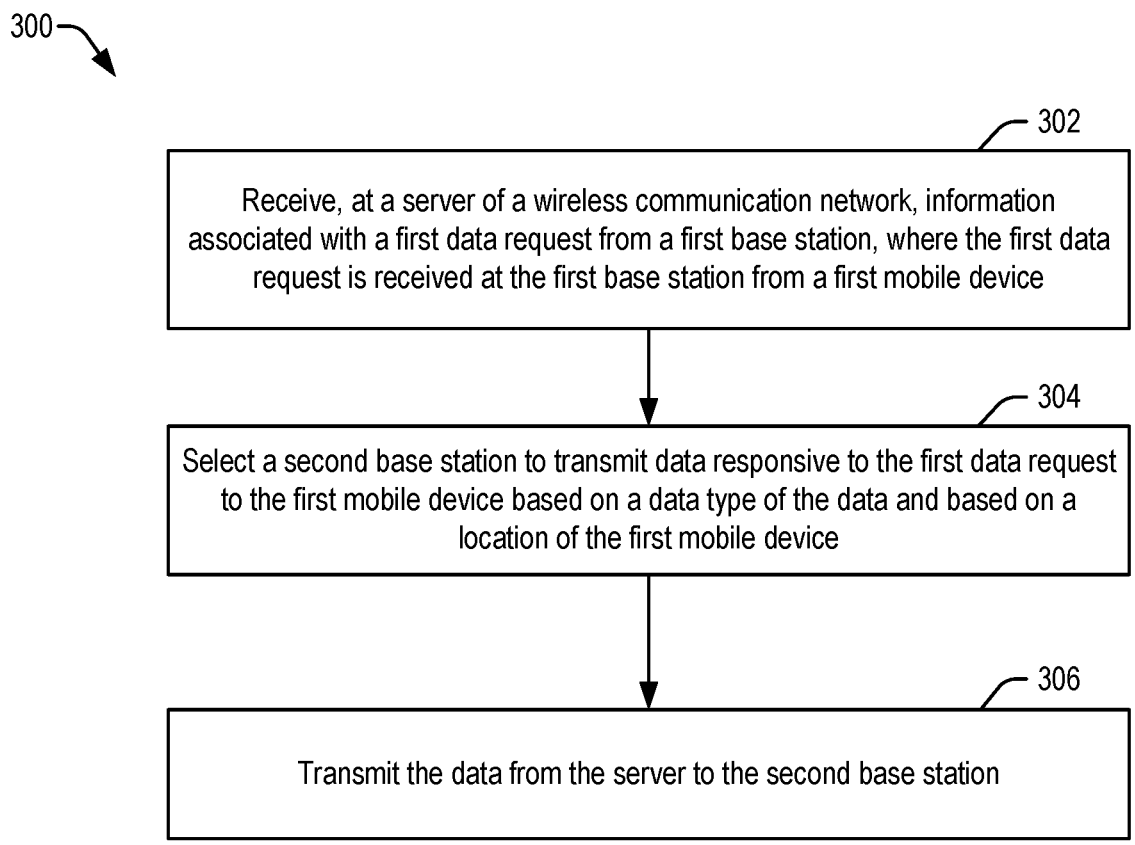
FIG. 3 is a flow diagram that illustrates a particular embodiment of a method for selecting a base station to transmit data to a mobile device based on a data type of data associated with a data request and a location of the mobile device that originated the data request.

FIG. 3 illustrates a particular embodiment of a method 300 for selecting a base station to transmit data to a mobile device based on a data request and a location of the mobile device. In FIG. 3, the mobile device may send a data request to a first base station, and the first base station may send information associated with the data request to a server. The server may select a second base station to transmit data to the mobile device based on the data request and based on a location of the mobile device.

The method 300 includes receiving, at a server of a wireless communication network, information from a first base station, at 302. The information is associated with a first data request that is received at the first base station from a first mobile device. As one example, referring to FIG. 1, the server 104 may receive the information 174 associated with the first data request 172 from the first base station 114. The first data request 172 may be received at the first base station 114 from the first mobile device 170. As another example, referring to FIG. 2, information associated with the data request 240 may be received at the third base station 220 from the first mobile device 230. As a further example, referring to FIG. 2, information associated with the data request 242 may be received at the fourth base station 222 from the second mobile device 232. As another example, referring to FIG. 2, information associated with the data request 244 may be received at the fifth base station 224 from the third mobile device 234.

In some embodiments, the server may receive location data associated with the mobile device from the base station that received the data request. As an example, referring to FIG. 1, the server 104 may receive the location data 176 from the first base station 114. FIG. 1 further illustrates that, in some cases, the first base station 114 may receive the location data 176 from the first mobile device 170. Alternatively, the first base station 114 may estimate a location of the first mobile device 170 (e.g., using triangulation) and may provide the estimated location to the server 104 as the location data 176. The server 104 may determine the location of the first mobile device 170 based on the location data 176. FIG. 2 illustrates another example in which the first mobile device 230 provides the location data 260 to the third base station 220. In this case, the third base station 220 may provide the location data 260 to a server (not shown in FIG. 2), and the server may determine the location of the first mobile device 230 based on the location data 260.

The method 300 includes selecting a second base station to transmit data responsive to the data request to the first mobile device based on a data type of the data and based on a location of the first mobile device, at 304. For example, referring to FIG. 1, the server 104 may select the second base station 116 to transmit the data 178 to the first mobile device 170 responsive to the first data request 172 based on the data type (e.g., the second data type) of the data 178 and based on the location of the first mobile device 170. As another example, referring to FIG. 2, the first mobile device 230 transmits the data request 240 to the third base station 220, the second mobile device 232 transmits the data request 242 to the fourth base station 222, and the third mobile device 234 transmits the data request 244 to the fifth base station 224. A server (not shown in FIG. 2) may select the first base station 210 to transmit the data 250 to the first mobile device 230 (responsive to the data request 240) and to transmit the data 250 to the second mobile device 232 (responsive to the data request 242). Further, the server may select the second base station 212 to transmit the data 290 to the third mobile device 234 (responsive to the data request 244).

The method 300 includes transmitting the data from the server to the second base station, at 306. For example, referring to FIG. 1, the server 104 may transmit the data 178 to the second base station 116. FIG. 1 further illustrates that the second base station 116 may transmit the data 178 to the first mobile device 170. As another example, referring to FIG. 2, a server (not shown in FIG. 2) may transmit the data 250 to the first base station 210, and the first base station 210 may transmit the data 250 to the first mobile device 232 and to the second mobile device 232 (e.g., via a downlink channel). As a further example, referring to FIG. 2, a server (not shown in FIG. 2) may transmit the data 290 to the second base station 212, and the second base station 212 may transmit the data 290 to the third mobile device 234 (e.g., via a downlink channel).

Thus, FIG. 3 illustrates that a mobile device may send a data request (e.g., a request for media content) to one base station, and a server may select an alternative base station for transmitting data (e.g., the media content) to the mobile device. The alternative base station may represent a CBT that is designated to provide multimedia content to mobile device(s) of a wireless communication network.

Figure 4:
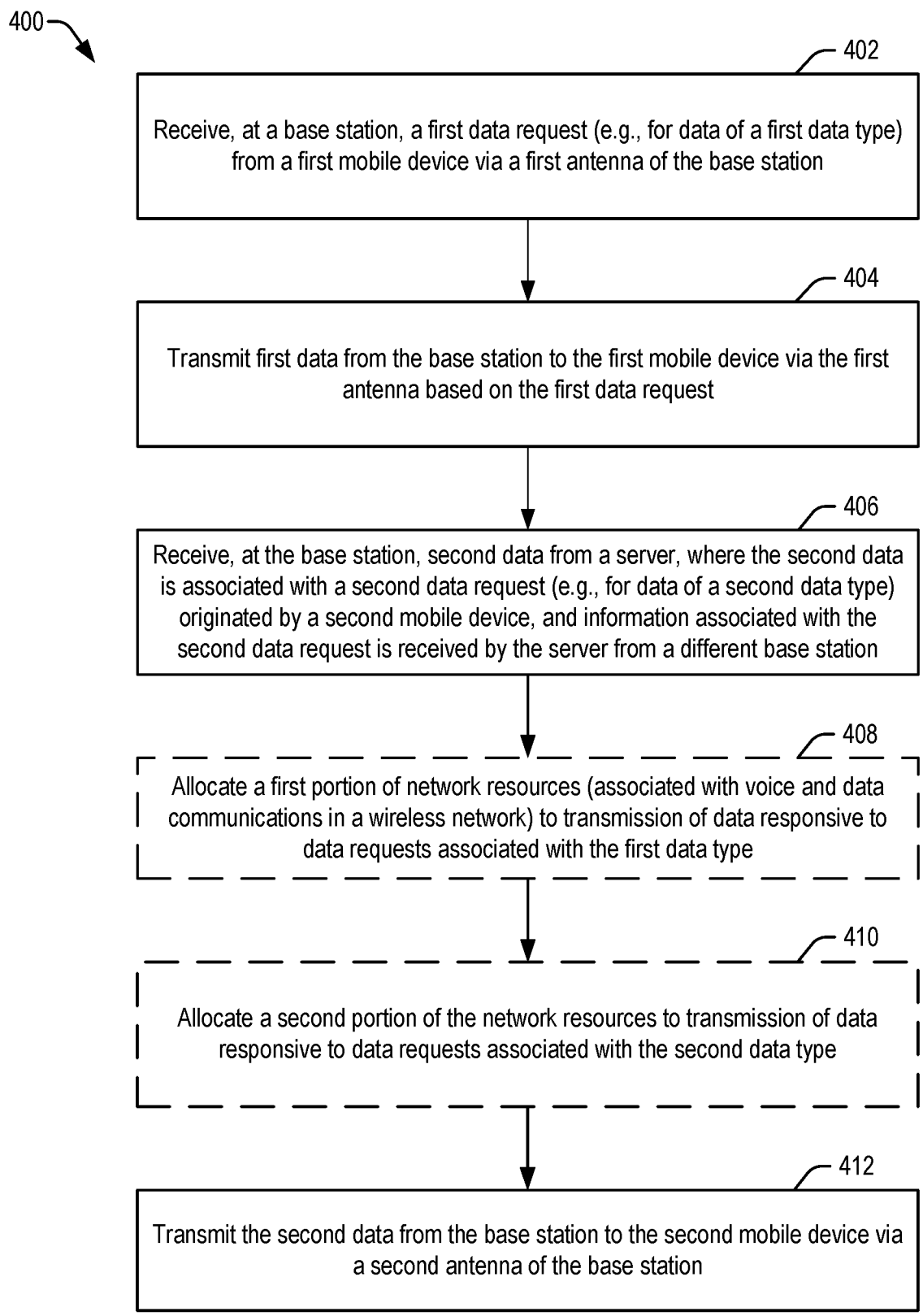
FIG. 4 is a flow diagram that illustrates a particular embodiment of a method for selecting a particular antenna of a base station to be used to transmit data to a mobile device based on a data type of data associated with a data request from the mobile device.

Referring to FIG. 4, a particular embodiment of a method for selecting a particular antenna of a base station to be used to transmit data to a mobile device based on a data type of data associated with a data request from the mobile device is illustrated and generally designated 400. In the example of FIG. 4, different portions of available network resources (e.g., LTE resource blocks) may be allocated to transmission of data (e.g., in response to data requests for data of different data types). One antenna of the base station may be selected for transmitting data of one data type, while another antenna of the base station may be selected for transmitting data of another data type.

The method 400 includes receiving a first data request at a base station, at 402. The first data request is received from a first mobile device via a first antenna of the base station. In some embodiments, the first data request may be associated with data of a first data type (e.g., a request for voice or non-media content). For example, referring to FIG. 2, the second base station 112 may receive the data request 246 from the fourth mobile device 236 via a first antenna of the second base station 112. The data request 246 may represent a request to utilize the wireless network 202 for voice and/or data communications.

The method 400 further includes transmitting first data to the first mobile device via the first antenna based on the first data request, at 404. For example, referring to FIG. 2, the second base station 212 may transmit the data 294 to the fourth mobile device 236 via the first antenna based on the data request 246.

The method 400 includes receiving, at the base station, second data from a server, at 406. The second data is associated with a second data request originated by a second mobile device, and information associated with the second data request is received by the server from a different base station. In some embodiments, the second data request may be associated with data of the second data type (e.g., a request for media content). For example, referring to FIG. 2, the second base station 212 may receive data from a server (not shown in FIG. 2, see e.g., the server 104 of FIG. 1) that is associated with the data request 244. The data request 244 is originated by the third mobile device 234 and transmitted to the fifth base station 224. The data request 244 may be forwarded from the fifth base station 224 to the server to be provided to the second base station 212. For example, the data request 244 may correspond to a request for media content.

The method 400 may (optionally) include allocating a first portion of network resources to transmission of data responsive to data requests for data of a first data type, at 408. For example, referring to FIG. 2, the second base station 116 may allocate a first portion of network resources to transmission of data responsive to data requests for data of a first data type. To illustrate, the second base station 116 may allocate the first portion of the network resources for transmission of data (e.g., the data 294) responsive to data requests (e.g., the data request 246) that may represent requests to utilize the wireless network 202 for voice and/or data communications.

The method 400 may (optionally) include allocating a second portion of the network resources to transmission of data responsive to data requests for data of a second data type, at 410. For example, referring to FIG. 2, the second base station 116 may allocate a second portion of the network resources to transmission of data responsive to data requests for data of a second data type. To illustrate, the second base station 116 may allocate the second portion of the network resources for transmission of data (e.g., the data 290) responsive to data requests (e.g., the data request 244) that may represent requests for media content.

The method 400 also includes transmitting second data from the base station to the second mobile device via a second antenna of the base station, at 412. For example, referring to FIG. 2, the second base station 212 may utilize a second antenna to transmit the data 290 to the third mobile device 234 (e.g., via a downlink channel).

Thus, FIG. 4 illustrates that a base station may include multiple antennas, and a particular antenna to be used for transmitting data to a mobile device may be determined based on a particular data request (e.g., whether the data request is associated with multimedia content). In response to receiving a data request for data of a particular data type (e.g., a request for media content), the base station may dynamically allocate a portion of network resources (reserved for performing voice and/or data communications) for transmitting data (e.g., media content) to mobile device (s) of a wireless network.

Figure 5A:
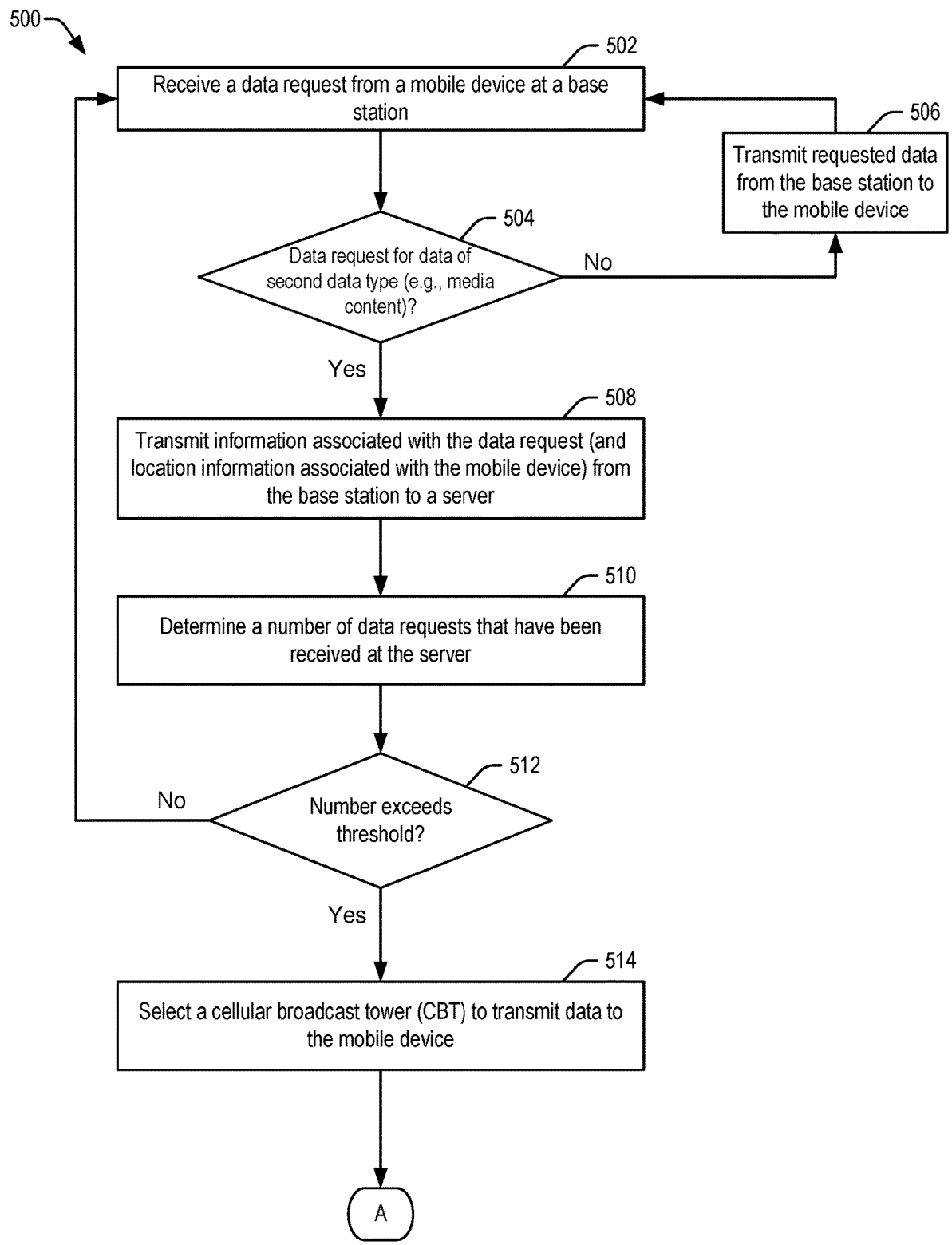
FIGS. 5A and 5B are flow diagrams that illustrate a particular embodiment of a method for selecting a cellular broadcast tower (CBT) to transmit data of a particular data type to a mobile device (e.g., when a number of data requests that have been received exceeds a threshold)
Figure 5B:
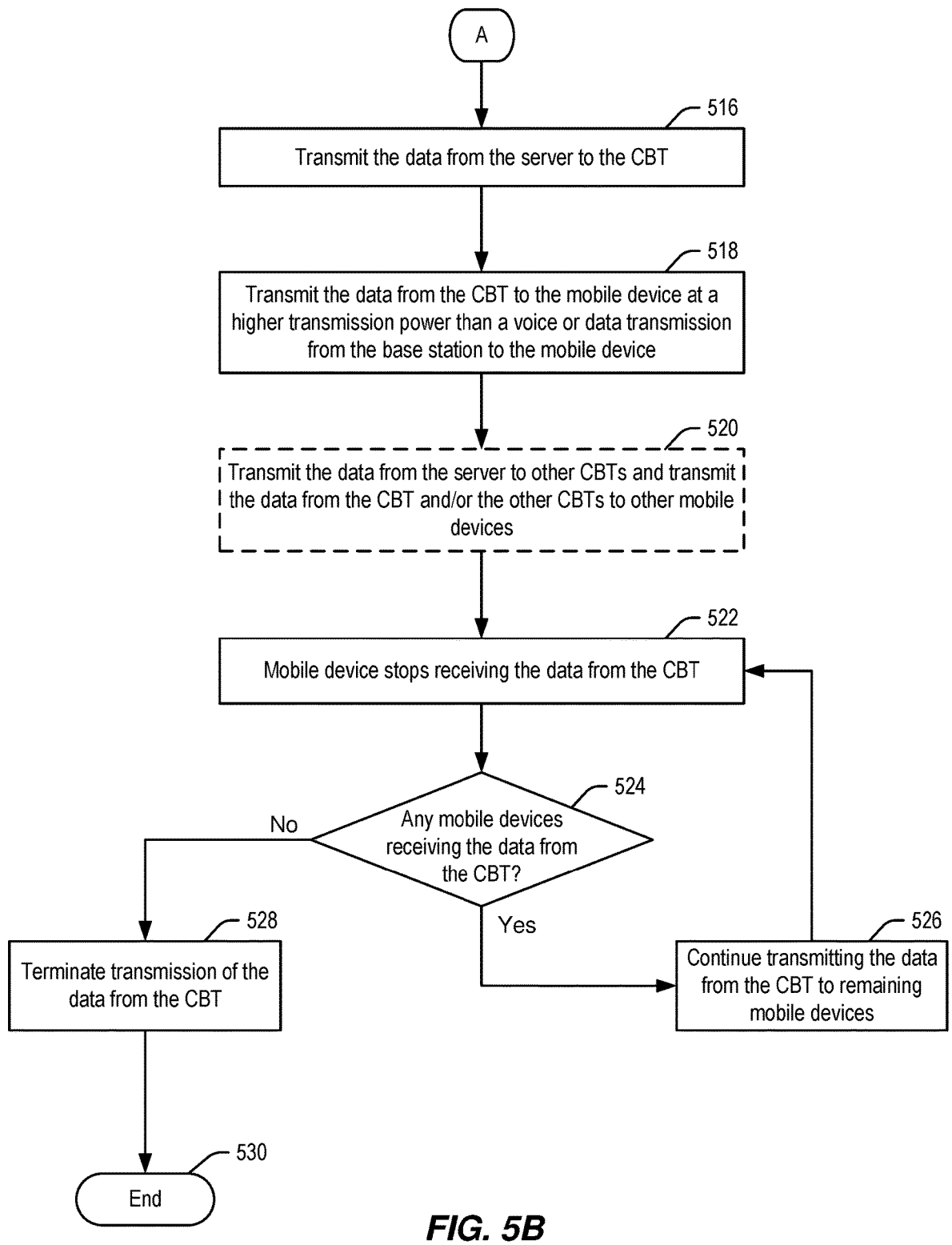

Referring to FIGS. 5A and 5B, a particular embodiment of a method for selecting a cellular broadcast tower (CBT) to transmit data to a mobile device (e.g., when a number of data requests that have been received exceeds a threshold) is illustrated and generally designated 500. For example, the data requested by the mobile device may include media content (e.g., broadcast media content, on-demand media content, etc.). FIGS. 5A and 5B further illustrate that a server may transmit the data to the selected CBT, and the CBT may transmit the data to the mobile device at a higher transmission power than a voice or data transmission to the mobile device. In response to receiving an indication that mobile device(s) are no longer receiving data from the CBT, the CBT may terminate transmission of the data.

The method 500 includes receiving a data request from a mobile device at a base station, at 502. For example, referring to FIG. 2, the third base station 220 may receive the data request 240 from the first mobile device 230. The method 500 includes determining whether the data request is associated with data of a second data type (e.g., media content), at 504. For example, referring to FIG. 2, the third base station 220 may determine whether the data request 240 is associated with a request for media content.

In response to determining that the data request is not associated with data of the second data type (e.g., the data request is associated with voice and/or non-media content), the method 500 includes transmitting requested data from the base station to the mobile device, at 506. In response to determining that the data request is associated with data of the second data type, the method 500 includes transmitting information associated with the data request (and location information associated with the mobile device) from the base station to a server, at 508. For example, referring to FIG. 2, the third base station 220 may transmit information associated with the data request 240 and the location data 260 associated with a location of the first mobile device 230 to a server (not shown in FIG. 2, see e.g., the server 104 of FIG. 1).

The method 500 includes determining a number of data requests that have been received at the server, at 510. The method 500 includes determining whether the number of data requests exceeds a threshold, at 512. In response to determining that the number of data requests does not exceed the threshold, the method 500 may return to 502, where the base station may wait to receive another data request from one or more other mobile devices. In response to determining that the number of data requests exceeds the threshold, the method 500 includes selecting a cellular broadcast tower (CBT) to transmit data to the mobile device, at 514. For example, referring to FIG. 2, the number of data requests may correspond to the data request 240 from the first mobile device 230 and the data request 242 from the second mobile device 242 (i.e., two data requests in this case). FIG. 2 illustrates an example in which the data two requests may satisfy a threshold for transmitting media content (e.g., the data 250). As such, the first base station 210 may be selected as the CBT to transmit the data 250 to the first mobile device 230 and to the second mobile device 232.

Referring to FIG. 5B, the method 500 proceeds from selecting the CBT (at 514 in FIG. 5A) to transmitting the data from the server to the CBT, at 516. The method 500 includes transmitting the data from the CBT to the mobile device, at 518. The data is transmitted at a higher transmission power than a voice or data transmission from the base station to the mobile device. For example, referring to FIG. 2, the first base station 210 may receive the data 250 from a server (not shown in FIG. 2, see e.g., the server 104 of FIG. 1) and may transmit the data 250 to the first mobile device 230 and to the second mobile device 232. As illustrated in FIG. 2, a transmission power associated with transmitting the data 250 from the first base station 210 may allow the first base station to transmit the data 250 to mobile device(s) within the first transmission range 214. By contrast, a transmission power associated with voice and/or data transmission from the first base station 210 may be associated with the second transmission range 270 (i.e., a reduced transmission range with respect to the first transmission range 214).

In some embodiments, the method 500 also includes transmitting the data from the server to other CBTs, at 520. The data may be transmitted from the CBT and/or the other CBTs to other mobile devices. For example, while not shown in FIG. 2, the first base station 210 may represent one CBT of the wireless network 202, and the second base station 212 may represent another CBT of the wireless network 202. As such, in some cases, the server may transmit the data 250 to the first base station 210 and to the second base station 212.

The method 500 includes the mobile device stopping receiving the data from the CBT, at 522. For example, referring to FIG. 2, the first mobile device 230 may transmit the termination message 282 to the first base station 210 to indicate that a subscriber is no longer viewing the media content. The method 500 includes determining whether any mobile devices are receiving the data from the CBT, at 524. For example, referring to FIG. 2, the second mobile device 232 has not yet sent a termination message to the first base station 210 to indicate that a subscriber is no longer viewing the media content.

In response to determining that other mobile devices are receiving the data from the CBT, the method 500 includes continuing to transmit the data from the CBT to remaining mobile devices, at 526. For example, referring to FIG. 2, the first base station 210 may determine, based on the lack of a termination message from the second mobile device 232, that the second mobile device 232 is still receiving the data 250 from the first base station 210. As such, the first base station 210 may continue to transmit the data 250 to the second mobile device 232.

In response to determining that no mobile devices are receiving the data from the CBT, the method 500 includes terminating transmission of the data from the CBT, at 528. For example, referring to FIG. 2, the first base station 210 may determine that the first mobile device 230 and the second mobile device 232 are no longer receiving the data 250 in response to receiving the termination message 282 from the first mobile device 230 and a termination message (not shown in FIG. 2) from the second mobile device 233. The method 500 ends at 530.

Thus, FIGS. 5A and 5B illustrate that a CBT of a wireless network may be selected to transmit data (e.g., media content) to one or more mobile devices (e.g., when a number of data requests that have been received exceeds a threshold). Further, the CBT may continue to transmit the data to the mobile device(s) until the CBT determines that no mobile device(s) are receiving the data (e.g., based on whether a termination message has been received from each mobile device). Network resources may be reserved for providing voice and/or data communications until the threshold is satisfied and may be selectively allocated to providing media content transmissions while mobile device(s) continue to receive the media content.

Figure 6:
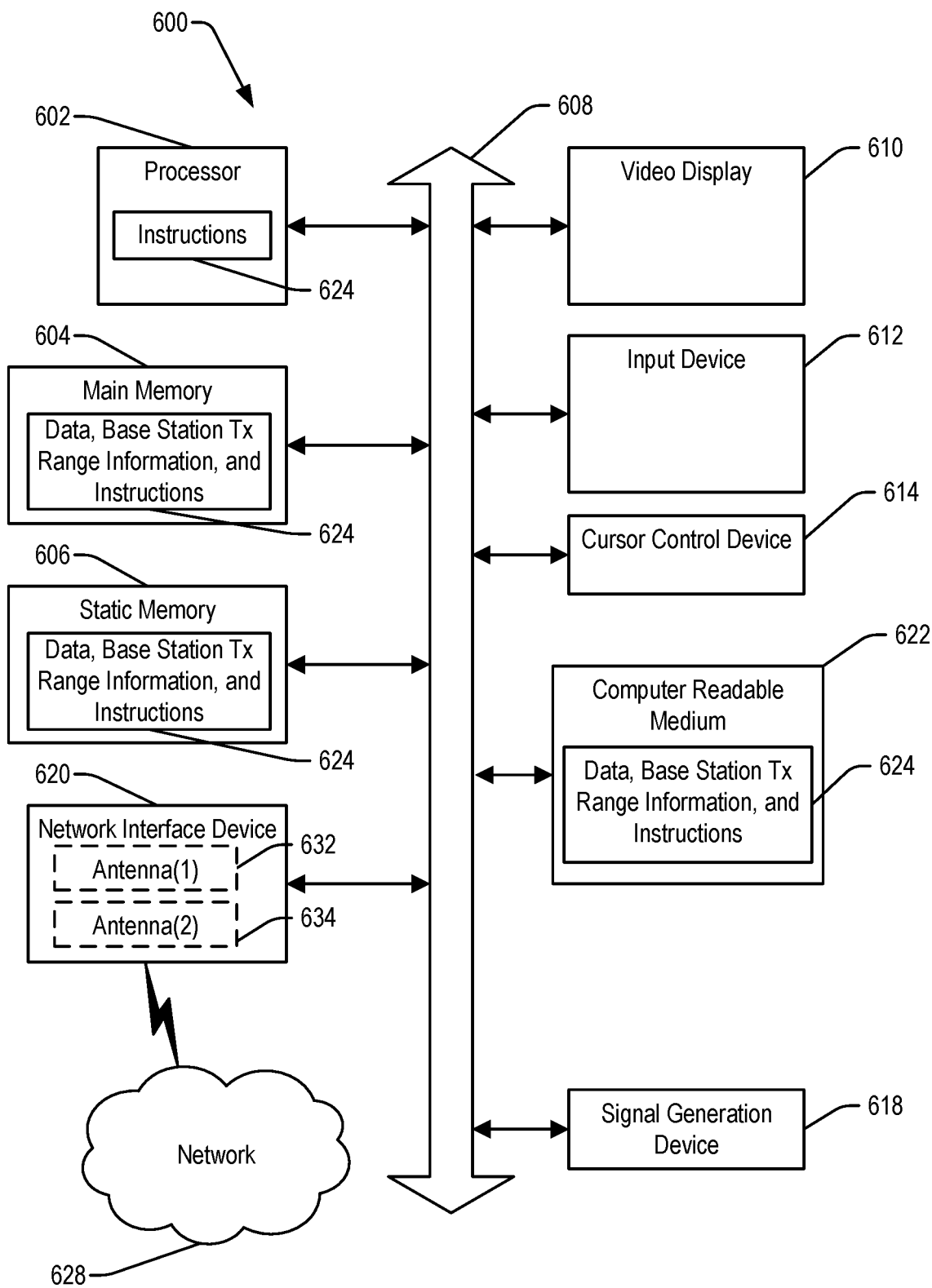
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the server 110, the base stations 120, 130, 140, 150, or combinations thereof described with reference to FIG. 1. As another example, the computer system 600 may include or be included within any one or more of a server (not shown in FIG. 2), the base stations 210, 212, 220, 222, 226, or combinations thereof described with reference to FIG. 2.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. For example, the processor 602 may include or correspond to the processor 106 of the server 104, the processor 122 of the first base station 114, the processor 132 of the second base station 116, the processor 148 of the third base station 118, or the processor 158 of the fourth base station 120 illustrated in FIG. 1. As another example, while not illustrated in FIG. 2, the processor 602 may include or correspond to a processor of a server or a processor of the base stations 210, 212, 220, 222, 224, 226. Moreover, the computer system 600 may include a main memory 604 and a static memory 606, which can communicate with each other via a bus 608. For example, the main memory 604 may include or correspond to the memory 108 of the server 104, the memory 124 of the first base station 114, the memory 134 of the second base station 116, the memory 150 of the third base station 118, or the memory 160 of the fourth base station 120 illustrated in FIG. 1. As another example, while not illustrated in FIG. 2, the main memory 604 may include or correspond to a memory of a server or a processor of the base stations 210, 212, 220, 222, 224, 226. As shown, the computer system 600 may further include a video display unit 610, such as a liquid crystal display (LCD), a light emitting diode (LED) display, a touch screen display, a flat panel display, or a solid state display. Additionally, the computer system 600 may include an input device 612, such as a remote control device or a keyboard, and a cursor control device 614, such as a mouse. In some embodiments, the input device 612 and the cursor control device 614 may be integrated into a single device, such as a capacitive touch screen input device. The computer system 600 may also include a signal generation device 618, such as a speaker, and a network interface device 620. Some computer systems 600 may not include an input device (e.g., a server may not include an input device).

In a particular embodiment, as depicted in FIG. 6, the device 600 may include computer-readable storage 622 in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may embody one or more of the methods or logic as described herein. When the device 600 corresponds to a server, FIG. 6 illustrates that the instructions 624 may include data, base station transmission range/power information, and other instructions. For example, referring to the server 104 of FIG. 1, the instructions 624 may include the data 110, the base station selector 112, and the information associated with a plurality of base stations. For example, in the example of FIG. 1, information associated with the first base station 120 may include the transmission range(s) 128 and the transmission power(s) 130, information associated with the second base station 130 may include the transmission range(s) 140 and the transmission power(s) 142, information associated with the third base station 140 may include the transmission range(s) 154 and the transmission power(s) 156, and the information associated with the fourth base station 150 may include the transmission range(s) 166 and the transmission power(s) 168. The instructions 624 may be executable by the processor 602 to perform one or more functions or methods described herein, such as the methods 300, 400, or 500 described with reference to FIG.

3, 4, or 5A-5B, respectively. In a particular embodiment, the instructions 624 may reside completely, or at least partially, within the main memory 604, the static memory 606, and/or within the processor 602 during execution by the computer system 600. The main memory 604 and the processor 602 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 622 that stores instructions 624, so that a device connected to a network 628 may communicate voice, video or data over the network 628. While the computer-readable storage 622 is shown to be a single device, the computer-readable storage 622 may include a single device or multiple devices, such as a centralized or distributed database, and/or associated caches and servers that store one or more sets of instructions. The computer-readable storage 622 is capable of storing a set of instructions for execution by a processor to cause a computer system to perform any one or more of the methods or operations disclosed herein. For example, the computer-readable storage device 622 may store instructions for execution by a processor to cause a computer system to perform any one or more of the methods 300, 400, or 500 described with reference to FIG. 3, 4, or 5A-5B, respectively.

In a particular non-limiting, exemplary embodiment, the computer-readable storage 622 may include a solid-state memory such as embedded memory (or a memory card or other package that houses one or more non-volatile read-only memories). Further, the computer-readable storage 622 may be a random access memory or other volatile rewritable memory. Additionally, the computer-readable storage 622 may include a magneto-optical or optical device, such as a disk or tapes or other storage device. Accordingly, the disclosure is considered to include any one or more of a computer-readable storage device and other equivalents and successor devices, in which data or instructions may be stored.

FIG. 6 further illustrates that the device 600 may include one or more antennas (e.g., when the device 600 corresponds to a base station). In the example of FIG. 6, the device 600 includes a first antenna 632 and may also include a second antenna 634. For example, the first antenna 632 may correspond to the antenna 126 of the first base station 116 of FIG. 1, the first antenna 136 of the second base station 116 of FIG. 1, the antenna 152 of the third base station 118 of FIG. 1, or the first antenna 162 of the fourth base station 120 of FIG. 1. As another example, the second antenna 634 may correspond to the second antenna 138 of the second base station 116 of FIG. 1 or the second antenna 164 of the fourth base station 120 of FIG. 1. Further, while not illustrated in FIG. 2, each of the base stations 210, 212, 220, 222, 224, and 226 may include one or more antennas. For example, the first base station 210 and the second base station 212 may correspond to CBTs of the wireless network 202 and may include two antennas. As another example, the other base stations 220, 222, 224, 226 may represent "conventional" base stations and may include one antenna.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A server, comprising:
   a processing system including a processor; and
   a memory that stores executable instructions that, when executed by the processing system, facilitate performance of operations comprising:
   receiving, from a first base station, first information associated with a first data request and second information associated with a second data request;
   transmitting first data to a second base station based at least in part on the first data having a first data type; and
   transmitting second data to the first base station based at least in part on the second data having a second data type that is different than the first data type, wherein the first data and second data respectively are to be transmitted to a mobile device in response to the first data request and the second data request, wherein at least a portion of the second data is transmitted via a particular frequency band outside of a frequency spectrum specified for downlink communications.

2. The server of claim 1, wherein the operations further comprise selecting the second base station based on the first data type.

3. The server of claim 1, wherein the operations further comprise:

receiving location data associated with the mobile device from the first base station; and
determining a location of the mobile device based on the location data.

4. The server of claim 3, wherein the operations further comprise selecting the second base station based on the location of the mobile device.

5. The server of claim 1, wherein the first data type includes one or both of:
   voice communications; and
   data communications.

6. The server of claim 1, wherein the second data type includes multimedia content.

7. The server of claim 1, wherein the second data comprises broadcast content or on-demand content.

8. A method, comprising:
   receiving, by a processing system including a processor, from a first base station, first information associated with a first data request and second information associated with a second data request;
   transmitting, by the processing system, first data to a second base station based at least in part on the first data having a first data type, wherein the first data type comprises one or both of:
   voice communications; and
   data communications; and
   transmitting, by the processing system, second data to the first base station based at least in part on the second data having a second data type that is different than the first data type, wherein the first data and second data respectively are to be transmitted to a mobile device in response to the first data request and the second data request, wherein at least a portion of the second data is transmitted via a particular frequency band outside of a frequency spectrum specified for downlink communications.

9. The method of claim 8, further comprising selecting the second base station, by the processing system, based on the first data type.

10. The method of claim 8, further comprising:
    receiving, by the processing system, location data associated with the mobile device from the first base station; and
    determining, by the processing system, a location of the mobile device based on the location data.

11. The method of claim 10, further comprising selecting the second base station, by the processing system, based on the location of the mobile device.

12. The method of claim 8, wherein the second data type includes multimedia content.

13. The method of claim 8, wherein the second data comprises broadcast content or on-demand content.

14. A non-transitory machine-readable medium comprising executable instructions that, when executed by a processing system including a processor, facilitate performance of operations comprising:
    receiving, from a first base station, first information associated with a first data request and second information associated with a second data request;
    transmitting first data to a second base station based at least in part on the first data having a first data type; and
    transmitting second data to the first base station based at least in part on the second data having a second data type that is different than the first data type, wherein the first data and second data respectively are to be transmitted to a mobile device in response to the first data request and the second data request, wherein at least a portion of the second data is transmitted via a particular frequency band outside of a frequency spectrum specified for downlink communications.

15. The non-transitory machine-readable medium of claim 14, wherein the first data type includes one or both of:
voice communications; and
data communications.

16. The non-transitory machine-readable medium of claim 14, wherein the second data type includes multimedia content.

17. The non-transitory machine-readable medium of claim 14, wherein the second data comprises broadcast content or on-demand content.

18. The non-transitory machine-readable medium of claim 14, wherein the operations further comprise selecting the second base station based on the first data type.

19. The non-transitory machine-readable medium of claim 14, wherein the operations further comprise:
receiving location data associated with the mobile device from the first base station; and
determining a location of the mobile device based on the location data.

20. The non-transitory machine-readable medium of claim 19, wherein the operations further comprise selecting the second base station based on the location of the mobile device.

* * * * *